Oct. 14, 1930.     L. WESTGAARD ET AL     1,778,133
EYE SHADE
Filed Sept. 18, 1928
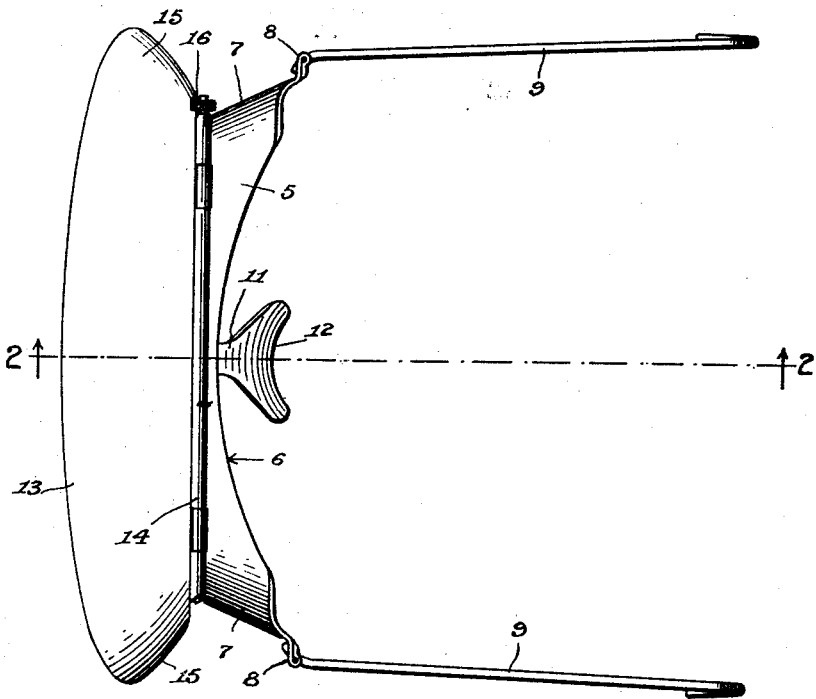
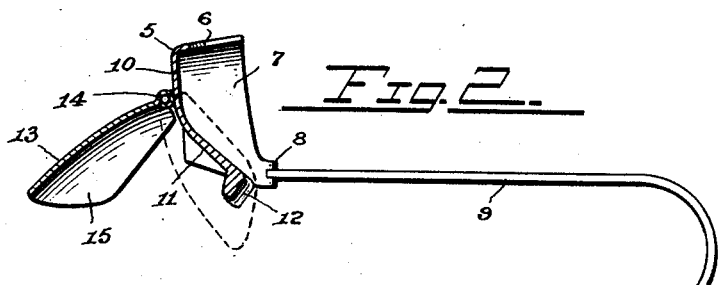
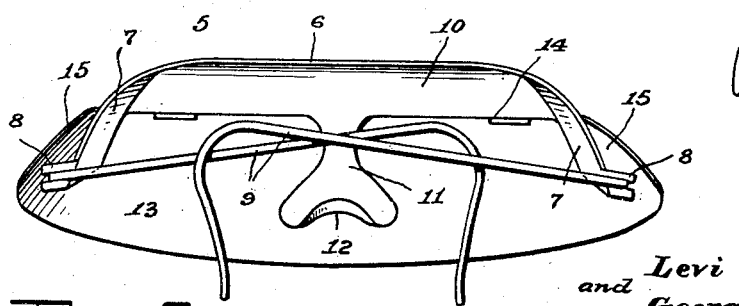
Inventors
Levi Westgaard
and George M. Taggart Jr.
By John W. Maupin.
Attorney Patented Oct. 14, 1930

1,778,133

UNITED STATES PATENT OFFICE

LEVI WESTGAARD AND GEORGE M. TAGGART, JR., OF SEATTLE, WASHINGTON

EYE SHADE

Application filed September 18, 1928. Serial No. 306,663.

Our invention relates to eye-shades and one object of the invention is to provide an eye-shade having a hinged visor adapted for pivotal movement and adjustment to various positions. Another object is to provide an eye-shade comprising a head member with a nose support and having a visor or shade member hingedly secured to the head member. A further object is to provide an eye-shade that is adapted to be folded into compact form for convenience in carrying. Still further objects are to provide an eye-shade having a head member for excluding lights from the sides and a visor for excluding rays of light from overhead.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:

Figure 1 is a top plan view of our eye-shade;

Fig. 2 is a view in vertical section taken substantially on a broken line 2, 2 of Fig. 1; and Fig. 3 is a bottom plan view of the device in its folded position.

Referring to the drawings throughout which like reference numerals designate like parts, the numeral 5 indicates a head member as a whole. The upper portion of said head member is curved inwardly at 6 so that it will fit snugly against the brow of the wearer and exclude the light. Its end portions are curved downwardly, as at 7, for the purpose of shielding the eyes from lights on the sides and lugs 8 are formed on its inner corner portions to which temple members 9 are pivotally secured as clearly shown in the drawings.

The forward portion 10 of the head member 5 is disposed vertically and extends all the way across said head member with its ends joined to the downwardly disposed end portions 7 thereof. A nose support 11 depending from the center of said forward portion slants inwardly and its expanded end is curved at 12 to fit the nose of the wearer for the purpose of supporting the device as will be readily understood.

A visor or shade member 13 is hinged at 14 to the lower edge of the forward portion 10 of the head member 5. The end portions 15 of said shade member are curved downwardly and cooperate with the end portions 7 of the head member in excluding the light. Ordinarily the friction in the hinge connection is sufficient to retain the visor in whatever position it may be placed. However we sometimes prefer to use a thumb screw 16 on one end of said hinge as shown in Fig. 1 for the purpose of serving as an additional means for retaining the visor or shade member in any desired pivotal position as will be understood.

In donning our eye-shade the head member 5 is placed in position with the nose support 11 resting on the bridge of the nose and the curved portion 6 fitting snugly against the forhead just above the eyes. The temple members 9 fitting behind the ears will hold the device in this position as it is preferably made of celluloid and is light in weight. The shade member 13 is then pivotally adjusted to the proper position for excluding the light. When not in use the shade member is folded all the way down as indicated in dotted lines in Fig. 2 and the temple members are folded inwardly when the device will be in the compact shown in Fig. 3 and may be conveniently carried in the pocket.

It will be understood that we do not wish to confine ourselves to the exact form of construction herein shown. Our object is primarily to provide an eye-shade with a visor that is adapted to be pivotally adjusted to various positions for excluding the light in so far as is possible without obstructing the vision. This visor may be pivoted to other supporting means than shown herein and in fact it may be pivotally mounted on a pair of eye glasses if so desired. The visor may likewise be made in other shapes and it may also be constructed in several parts if desired.

Having thus described our invention what we claim and desire to secure by Letters Patent of the United States is:—

1. An eye-shade comprising a head member adapted to shade the eyes, temple members, a nose support for the head member, downwardly curved end portions for the head member, and a visor hingedly secured to said head member for pivotal adjustment in various positions overlapping the head member.

2. An eye-shade comprising a head member, temple members, a nose support, downwardly curved end portions for the head member, a visor hingedly secured to the head member, and means for adjusting said visor in various pivotal positions and in overlapping cooperation with the head member whereby the eyes are shaded from the light without obstructing the lines of vision on the sides.

In witness whereof, we hereunto subscribe our names this 13 day of September, A. D. 1928.

LEVI WESTGAARD.
GEORGE M. TAGGART, Jr.